June 20, 1950 R. H. GODDARD 2,511,979
VACUUM TUBE TRANSPORTATION SYSTEM
Filed May 21, 1945 3 Sheets-Sheet 1
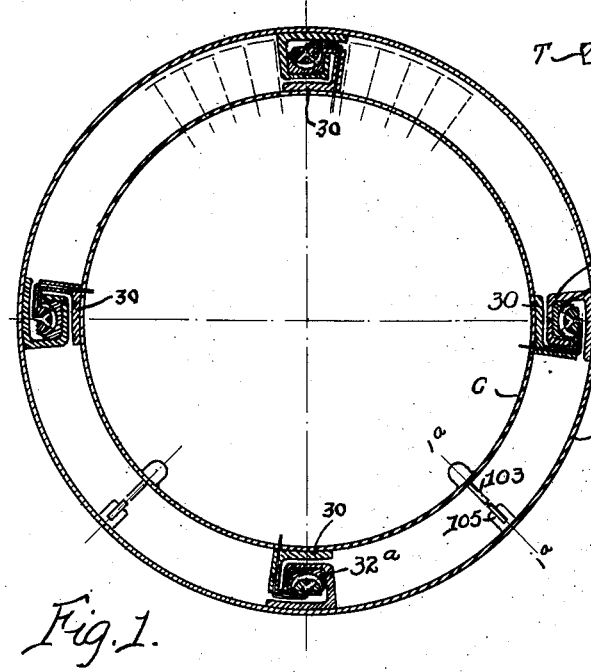
Fig.1.
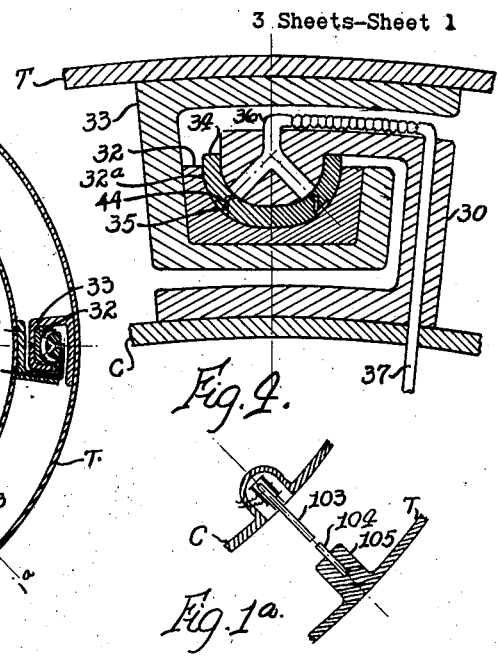
Fig.4.
Fig.1a.
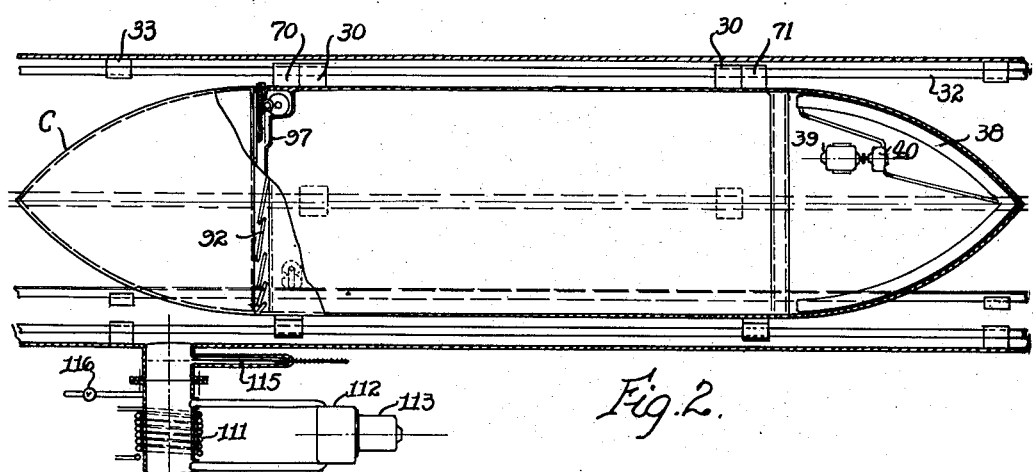
Fig.2.
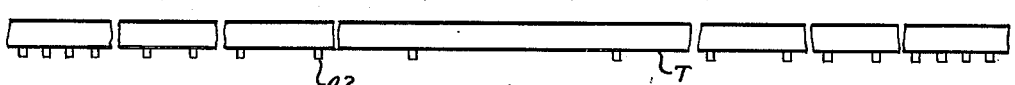
Fig.3.
INVENTOR.
Robert H. Goddard.
BY Chas. T. Hawley
ATTY.

June 20, 1950 R. H. GODDARD 2,511,979
VACUUM TUBE TRANSPORTATION SYSTEM
Filed May 21, 1945 3 Sheets-Sheet 2
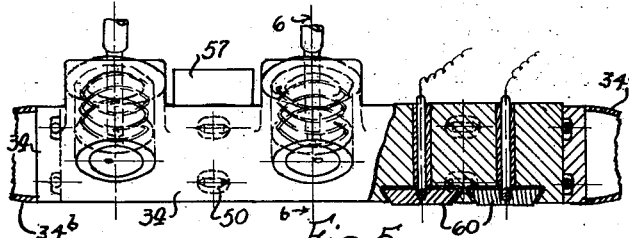
Fig. 5.
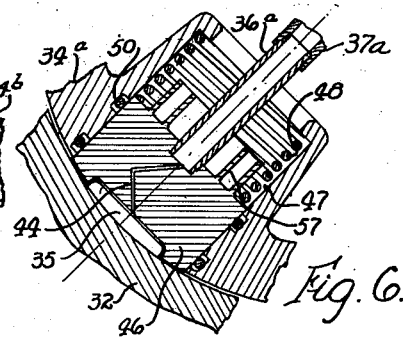
Fig. 6.
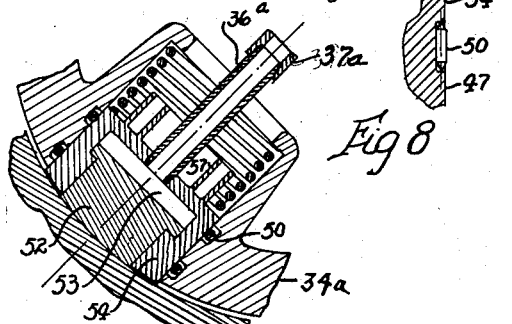
Fig. 7.
Fig. 8.
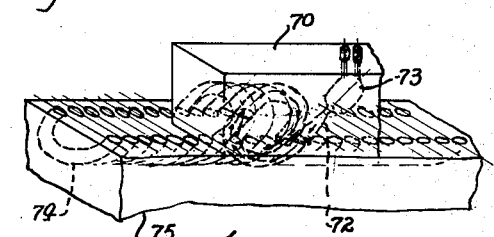
Fig. 9.
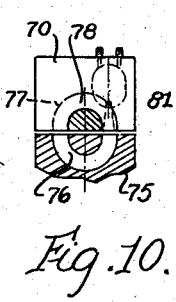
Fig. 10.
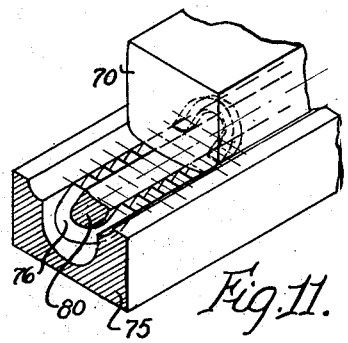
Fig. 11.
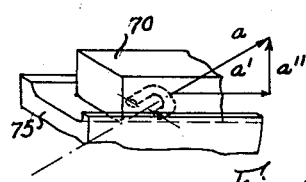
Fig. 12.
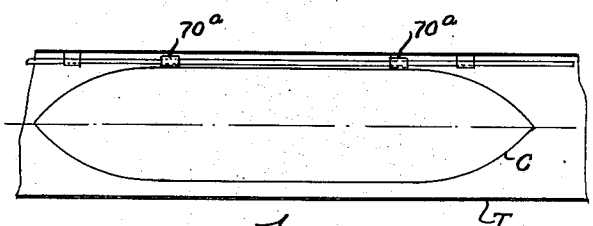
Fig. 13.
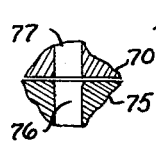
Fig. 12.ª
INVENTOR.
Robert H. Goddard.
BY
Chas. T. Hawley
ATTY.

June 20, 1950 R. H. GODDARD 2,511,979
VACUUM TUBE TRANSPORTATION SYSTEM
Filed May 21, 1945 3 Sheets-Sheet 3

INVENTOR.
Robert H. Goddard.
BY Chas. T. Hawley
Atty.

Patented June 20, 1950

2,511,979

UNITED STATES PATENT OFFICE 2,511,979

VACUUM TUBE TRANSPORTATION SYSTEM

Robert H. Goddard, Annapolis, Md.; Esther C. Goddard, executrix of said Robert H. Goddard, deceased, assignor of one-half to The Daniel and Florence Guggenheim Foundation, New York, N. Y., a corporation of New York Application May 21, 1945, Serial No. 594,845

9 Claims. (Cl. 104—138)

The present invention relates to a system of transportation in which a car containing goods or passengers is moved at high speed through a transportation tube which is maintained under a substantial vacuum.

In a copending application, Serial No. 564,143, filed November 18, 1944, now abandoned, I have disclosed a transportation system of this general type in which electro-magnetic forces are utilized to produce acceleration or deceleration and also to prevent frictional contact between relatively moving parts of the car and tube.

It is the general object of my present invention to produce acceleration and deceleration and to prevent friction by non-magnetic means, such as the application of fluid pressure between relatively movable parts.

Many features of construction shown in my prior application may be embodied in the present system, which will require means for preventing lateral displacement of the transportation tube, means for supporting the passengers against strong forces of acceleration or deceleration, means for efficiently loading and unloading the car, and means for locking the car to the ends of the transportation tube during a loading or unloading operation.

My invention further relates to arrangements and combinations of parts which will be hereinafter disclosed and more particularly pointed out in the appended claims.

A preferred form of the invention is shown in the drawings, in which

Fig. 1 is a transverse sectional elevation of the car and tube;

Fig. 1a is a detail sectional view to be described;

Fig. 2 is a sectional side elevation of the car and tube, together with certain associated parts;

Fig. 3 is a diagrammatic view indicating the location and distribution of certain gas-absorbing units;

Fig. 4 is a transverse sectional elevation of one of the car-supporting units;

Fig. 5 is a side elevation, partly in section, of a modified car-supporting unit;

Fig. 6 is a transverse sectional elevation, taken along the line 6—6 in Fig. 5;

Fig. 7 is a view similar to Fig. 6 but showing a further modified construction;

Fig. 8 is a detail sectional view showing one of the anti-friction rolls;

Fig. 9 is a perspective view of a traction or acceleration device;

Fig. 10 is an end elevation of the device, with the associated rail in section;

Fig. 11 is a perspective view of a simplified form of the construction shown in Fig. 10, partly in section;

Fig. 12 is a perspective view embodying a force diagram;

Fig. 12a is a detail sectional view to be described;

Fig. 13 is a sectional side elevation showing a modified suspension;

Figure 14:
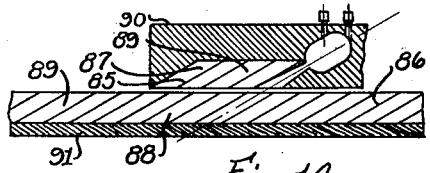
Fig. 14 is a sectional side elevation of a modified traction or acceleration device.

Certain general features of construction of my improved car C and transportation tube T are shown in Figs. 1 and 2. The car C is preferably of elongated cylindrical shape and is provided with streamlined and substantially conical pointed ends to reduce air-resistance.

The car C is supported and guided in the tube T by supports or brackets 30, fixed to the top, bottom and sides of the car near both ends thereof and coacting with rails 32 extending lengthwise of the tube T and secured thereto by spaced brackets 33. Each rail 32 has a concave segmental bearing surface 32a (Fig. 4) engaged by corresponding segmental bearing members 34 fixed to the inwardly offset outer ends of the supports or brackets 30.

Recesses 35 (Fig. 4) are provided in the convex faces of the segmental members 34, said recesses being preferably located at angles at 45° each side of a diametral line and being connected through a forked passage 36 to a pipe 37 supplying a suitable fluid under pressure.

The car is, in effect, suspended by these members 34, and the curved section of the members and rails, as shown in Fig. 4, permits slight sidewise motion without reducing the effectiveness of the elevating means.

The reaction of the fluid supplied through the pipes 37 to the recesses 35 introduces fluid pressure between the bearing members 34 and the rails 32 and provides a fluid film between the coacting curved surfaces which guide the car C axially along the transportation tube T. As the member 34 and rails 32 are disposed at the top, bottom and both sides of the car, the car is centered by fluid pressure exerted in four converging directions, and frictional contact between fixed and moving parts is substantially eliminated. Propulsion is obtained by traction members associated with certain elevating members 34 and operated by gas or vapor pressure, as will be described.

This use of liquids and gases for sustaining and propelling the car renders it difficult to maintain an extremely high vacuum, and for this reason the car is not only made pointed at both ends, as shown in Fig. 2, but also has a cross section considerably less than that of the transportation tube, in order that such gas as is present will pass freely along the sides of the car without building up a pressure region in front. Because of the high temperature which may be produced by impact with any gas in the tube T, even of low density, both ends of the car are preferably covered with a thin highly refractory layer of insulating material and may be cooled at very high speed by the circulation of a cooling fluid in a jacket space 38 (Fig. 2) under each conical end, the cooling circulation being maintained by means of a pump 39 and a refrigerating unit 40.

As there is continuous addition of gases to the transportation tube during car operation, absorbing devices 42 (Fig. 3) are installed on the transportation tube at intervals, these being hereinafter described and being arranged relatively close together near the ends of the tube for a reason to be explained.

A supporting fluid, either liquid or gas, is forced through small holes 44 (Fig. 4) to the elevating recesses 35. The action is as follows: High fluid pressure is applied through the holes 44, and this pressure is exerted on the rail 32 over the entire cross section of each recess 35. The fluid escapes around the edge of this recess, if the applied pressure is adequate. The pressure in the resulting film between the part 34 (Fig. 4) and the rail 32 falls off rapidly, and the fluid finally escapes into the tube T around the edge of the support member 30. Resistance is preferably introduced into the small holes 44, this being obtained most simply by placing one or more sharp bends in each hole, as shown.

Stable action under a varying load is obtained through the combination of the relatively large cross section of the recesses 35 and the resistance in the holes 44. Thus, if the load on the car part bearing the recess 35 increases and the pressure applied to the hole 44 remains constant, the rate of flow through the hole 44 will decrease, and pressure will be built up within the recess 35. Since the recess is shallow, the pressure will rise quickly. Moreover, the pressure will tend to remain high, since, with diminished clearance between support member 34 and rail 32, the leakage from the recesses 35 will be reduced. A stronger than normal thrust on the support member therefore does not cause contact to be made, since the effective repelling force is automatically increased.

When, on the other hand, the load decreases while the applied fluid pressure remains the same, the clearance between the support member and the rail increases somewhat. Fluid or gas then escapes from the recesses 35 and the pressure within the recesses drops, owing to the action of the holes 44 in restricting the inward flow. Not only is the car supported against variation of load, but also, by the use of pairs of inclined recesses 35 provision is made in each support member against lateral displacement of said member and associated parts.

Accidental strong jars will tend to produce considerable forces against the rails 32 and these forces, being momentary, may not afford time for pressure adjustments in the recesses 35 as described. I therefore prefer in many cases to adopt the modified construction shown in Figs. 5 and 6, in which each recess 35 and connected passage 44 is formed in a cylindrical plug 46 slidable in a corresponding recess 47 in the elevating member 34a and yieldingly pressed toward the rail 32 by a heavy coil spring 48. In order to permit independent movement of the plugs 46 (Fig. 6) a flexible supply pipe 37a may be used. Axial movement of the cylindrical plug 46 is facilitated by small rollers 50 mounted in the side walls of the cylindrical openings 47 (Fig. 8).

The ends of 34 and 34a are preferably covered with streamlined caps 34b, Fig. 5, which decrease air resistance and at the same time tend to force additional gas into the space between 34 or 34a and 32.

In Fig. 7 I have shown an optional construction in which use of the zig-zag holes 44 is avoided by using a porous metal plug 52 instead of the plug 46 previously described. The plug 52 is slidably mounted in a recess 53 in a cylindrical supporting member 54 and is firmly pressed outward against a shoulder 55 by fluid pressure applied through the connection 36a. The fluid under pressure, injected through the porous plug 52, forms a film between the plug and the rail 32 as in the construction shown in Fig. 6.

Normally, the entire outer surface of the plug 52 adjacent to the rail 32 is at high pressure, but this pressure decreases if the clearance between support and rail becomes excessive, owing to the resistance of the pores of the plug, which corresponds to the resistance of the angularly formed holes 44 when clearance is increased with the form shown in Figs. 4 or 6.

At very high car speeds, the energy used in overcoming the viscosity of the thin films present in the recesses 35 and especially in the small clearances between the members 34 (Fig. 4) and rails 32, will be so great that considerable heating will result. This will tend to reduce the viscous resistance and hence the heating itself. Thus, if a liquid is used to supply pressure, the heat will tend to convert this into a gas or vapor having much less viscosity. Further, any gas or vapor will, in turn, tend to become highly heated, reducing the viscosity even more.

This heat produced within the film will not warm the rail 32 appreciably, since it will occur only momentarily at any particular point on the rail. Heat will, however, tend to accumulate on the support members or plugs 46 (Fig. 6) and hence these members should be faced with a highly refractory surface layer, backed by a metal of good heat conductivity.

In the case of the porous plug type of support member, the material of the plug should be a good conductor of heat and at the same time should have a high melting point. A porous pressurized alloy, such as an alloy of copper and tungsten, used with an oxygen-free fluid, is most desirable. It will be seen that, although the porous disc or plug is less simple than the recessed plug, it has the advantage of transferring the heat generated in the active film to the entire incoming gas as it passes through the plug. Thus the resulting gas constitutes the entire active film, and there can be no liquid, or low temperature part, lost before it has had time to become highly heated.

Cooling fins or vanes 57 (Figs. 5, 6 and 7) are used on the members 46 and 54, the temperature being reduced by radiation. Even though but little gas is present in the transportation tube, the high car speed will cause a considerable mass flow to take place along these cooling fins.

When the car is not being elevated and yet sliding is taking place, as in starting, stopping, and accidentally during transit, means is required to reduce the unavoidable friction on the rails. For this purpose, an anti-friction metal that resists wear is desired in the form of shoes 60 (Fig. 5) at the ends of the support members 34. This figure shows two inserted shoe surfaces 60, preferably graphited to reduce friction, and having a metal, as tungsten, of great hardness and high melting point distributed throughout the material. The shoe surfaces preferably project a small distance, as 0.0005", beyond the supporting surface in order to avoid wear on the latter.

Suitable means, such as the valve 30 in the patent to Eells No. 1,053,368, may be provided to vary the air pressure in accordance with the load, so that the car may be kept normally clear of the rails when in motion. The forces required at the sides and bottom of the car are merely for the purpose of providing steadiness, and hence the area of these pressure recesses may be small and supplied at constant pressure.

A liquid is preferred to a gas for use as the active fluid, since a large mass of the liquid may be stored in the car under moderate pressure, occupying comparatively little bulk.

When the transportation tube is curved, rather than straight, lateral support members and rails on each side of the car are essential. All four rails are then twisted or displaced in the tube T at each curve, so that the center of gravity of the car will still be substantially in the plane including the top and bottom rails and where the resulting force is located. This reduces the forces on the lateral rails to that required merely to provide steadiness.

*Acceleration and deceleration*

The preferred traction means operates by gas action, or by gas rebound as it may more properly be termed, to increase or decrease the speed of the car, and is shown in Figs. 9, 10 and 11. The traction means is located in a traction member 70 (Fig. 9) and for simplicity only one traction member 70 for acceleration is shown on the car C in Fig. 2, although one at each end may be used if desired. A similar traction member 71 is shown for deceleration.

Each traction member 70 or 71 should be associated with a support member 30 for the reason that if springs were used back of traction members alone, these members would rub against the rails whenever the car moved without acceleration.

A gas or vapor under high pressure is supplied to a nozzle or other orifice 72 (Fig. 9) in the traction member. The gas may be piped flexibly from a suitable supply or may be produced in a combustion chamber 73. The gas or vapor, passing at high speed from this nozzle, which is inclined moderately to the axis of the car, passes into a long curved slot or passage 74 extending along the middle part of a rail 75, as shown diagrammatically in Fig. 9. In the preferred construction, the passage 74 is formed between vanes or blades 76 (Figs. 10 and 11) that receive the gas from the nozzle 72 nearly tangentially. The traction member 70 has a similar groove 77 provided with similar vanes 78. The vanes 76 and 78 extend around separate bars or rods 80 and 81 respectively, which bars are secured to the vanes 76 and 77 respectively and accurately space the inner edges of said vanes axially of the bars.

The rail 75 may be a separate element or may constitute an integral part of the upper supporting rail 32 previously described.

Gas from the nozzle 72 passes along the two sets of vanes or passages, pushing against the car and supplying acceleration when between the traction member vane 77 and being redirected when between the rail vanes 76. As the gases flow around the rods 80 and 81, they do not interfere with each other on entering and leaving the respective passages.

The length of the traction member 70 should be such that all the vanes 77 are utilized when the car speed is low or moderate. A greater length would cause the speed of the gas along the vanes to be reduced considerably by friction and it would not then supply a propulsive effect. When the car is traveling at high speed, few interchanges of gas between traction member and track will occur before the gases have lost all useful velocity, i. e. velocity in excess of the forward velocity of the car. As soon as this happens, the gases will automatically be left behind. To be effective, the gas from the redirecting vanes 76 in the rail must move out with a speed greater than that of the car.

There will be a considerable elevating force produced by the gases as they move along the set of vanes connected with the car, especially if the entering and leaving edges of the blades are not too nearly tangential. The reactive force produced by gases passing completely through a passage between two vanes as shown in Fig. 12 is evidently in the direction of the arrow *a*, and is twice what would be produced if the gas were merely stopped rather than redirected. This force, as shown in the figure, has a component *a'* in the axial direction, which produces acceleration, and a component *a''* in the outward and radial direction, which produces an elevating force or lift.

There can be a considerable separation between the traction member 70 and the rail 75 and yet with very little leakage of gas. When the gas crosses the gap between the traction member and the track, the speed is so high that there is but little tendency for leakage to take place toward the sides. The entering edges of the grooves 76 or 77 are preferably beveled, as shown in Fig. 12*a* to prevent high speed gas from striking the edge of a recess.

As the traction members thus also produce lift, a simple form of this general method of transportation is possible in which two traction members alone are used, one at each end of a car, thus making special elevating means unnecessary. Such a simplified form is shown in Fig. 13, in which combined traction-elevation members 70a only are used.

Alternative accelerating means

Figure 15:
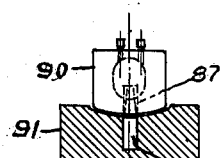
Fig. 15 is an end view thereof, partly in section.
Figure 16:
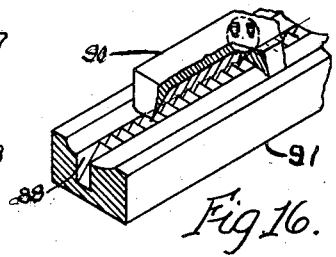
Fig. 16 is a perspective view thereof, partly in section.

A simplified form of the general accelerating means using gaseous rebound is shown in Figs. 14, 15 and 16 and is of importance in reducing the construction cost of long sets of rails, although at a sacrifice of propulsion efficiency. In this modification, the rods 80 and 81 are omitted and the vanes or blades 85 and 86 (Fig. 14) extend completely across coacting grooves or passages 87 and 88 to form buckets 89 in the traction members 90 and rail 91, the buckets being relatively narrow and rectangular in section. Gas or vapor under high pressure is directed into the inclined buckets 89 formed in the grooves 87 and 88.

Each time the gas enters a bucket or recess it is redirected, but instead of remaining at low pressure and gradually decreasing in speed after passing through a number of recesses, it now becomes compressed at the bottom of each bucket and then rebounds. This action continues until the velocity of the rebound from a rail bucket is lower than the velocity of the car, after which the gas is left behind.

Figure 17:
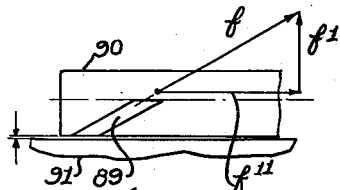
Fig. 17 is a diagrammatic side elevation embodying a force diagram.
Figure 16A:
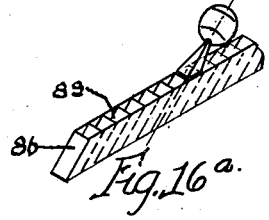
Fig. 16a is a perspective view of a series of buckets and associated parts.

As in the previously described form, an elevating force $f'$ is produced in addition to a propelling force $f''$ from the resultant force $f$ in each traction bucket 89, as indicated in Fig. 17. The lifting force may be increased by making the buckets less tangential with respect to the rails and the car axis.

Leakage between a traction member 90 and a rail 91 (Fig. 14) is low, because the pressure, while considerable at the bottoms of the buckets, is much less where the gases pass at high speed between a rail bucket and a car bucket.

Deceleration

Although the accelerating of the car requires an energy supply, deceleration can take place through dissipative forces and hence can be accomplished either by applied power or by resistance. For this reason, two decelerating means are preferably used, namely, a means involving the dissipation of energy by resistance, supplemented as needed by an applied air action or rebound means.

Figure 18:
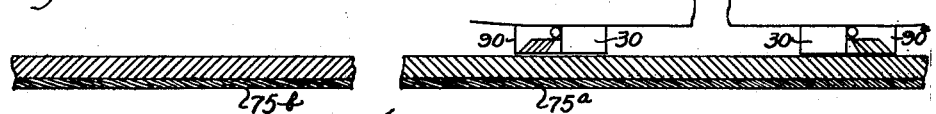
Fig. 18 is a sectional side elevation of associated accelerating and decelerating devices.

The latter means may be provided by reversing either of the two types of accelerating or traction members 70 or 90. A combination elevation and traction member may be used at each end of the car, as indicated in Fig. 18, the members 30 and 90a being used for acceleration in the direction of the arrow and the members 30 and 90 for deceleration in the same direction. Similarly, the buckets in the first and second halves 75a and 75b of the rails in the transportation tube are reversely directed. Elevation is obtained from the units 90 and 90a only in proportion to the amount of accelerating or decelerating force that is being used.

The main or resistance decelerating means consists of overlapping vanes or baffles 92 (Fig. 19) that are moved out from the side of the car near the rear end, and which may be extended to a sufficient distance to substantially fill the entire cross section of the transportation tube, except for the rails. By this means, the small amount of gas which unavoidably remains in the transportation tube, owing to the fact that vapors and gases are liberated by the processes of elevation and traction, is compressed and offers appreciable resistance at the very high speed. As the speed of the car decreases, the gas becomes more dense, due to compression and to the increments that are continually added. Any unsufficiency of decelerating force is made up by reverse traction effect as described. All devices extending between the tube T and the car C preferably have radial sides, so that a radially outward movement of the vanes 92 substantially fills this intervening space.

Figure 19:
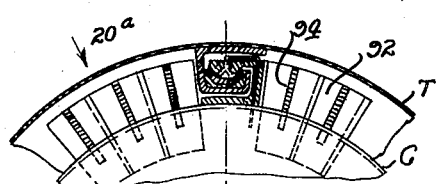
Fig. 19 is a partial transverse section of a car and tube and showing decelerating vanes.
Figure 20:
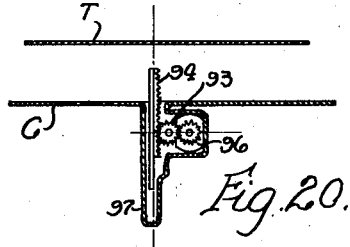
Fig. 20 is a longitudinal section of the same parts.
Figure 20A:
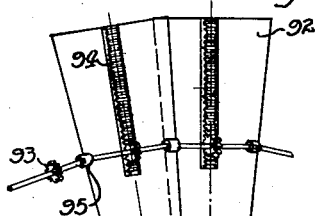
Fig. 20a is a detail plan view to be described, looking in the direction of the arrow 20a in Fig. 19.
Figure 21:
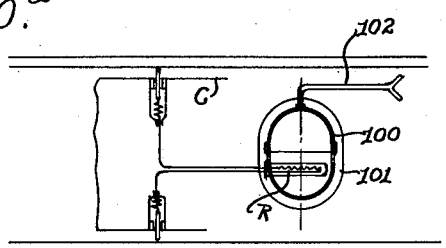
Fig. 21 is an enlarged side elevation of two associated vanes.

The vanes 92 for deceleration by air resistance and compression are shown in detail in Figs. 19, 20 and 21. Each vane 92 is moved by a pinion gear 93, acting on a rack bar 94 on the vane. The shafts of the pinion gears are connected by universal joints 95 at the ends of the individual shafts, and the combined annular shaft structure is rotated by an electric motor 96 (Fig. 20).

This motor, as well as all the parts just mentioned, is contained within an airtight wall or pocket 97, so that no packing is required to prevent air within the car from escaping into the transportation tube T. This pocket is relatively deep and the vanes are substantially longer than the radial distance between car C and tube T, thus providing support for the vanes 92. The pocket fits the vanes with but small clearance, in order to keep the vanes strictly in a plane perpendicular to the car axis. Both surfaces of each vane 92 are preferably faced with a thin refractory to reduce heating.

This braking system is used at the rear of the car only in order to provide stability. One such vane system is installed at each end of the car, when transit is to be alternately in reverse directions.

Although the combined supporting and accelerating means illustrated in Fig. 13 affords certain simplifications, it nevertheless requires that the acceleration and deceleration periods occupy the entire journey. With the use of supporting members 34, however, the rather complicated type of track shown in Figs. 9, 10, 11, or 14, 15, 16, need extend only part way inward from the ends of the tube T, giving a period of uniform high speed in the middle of the journey, with but a comparatively small increase in total time for the same acceleration.

The relation between the ratio of distance over which a particular acceleration is used to the entire half journey with the same acceleration, and the ratio of the increased time for the half journey to the time for acceleration over the half distance, is a third degree equation.

This relation is such that for the acceleration applied over 0.8 of the half distance, the time is increased only 0.6 per cent, and even for the acceleration applied over as little as 0.5 of the half distance, the time is increased but 6.5 per cent.

Active fluid and vacuum maintenance

I will now describe the fluids to be used for pressure and the means for maintaining a sufficiently low vacuum in the transportation tube, both depending in part on the speed of transportation required. In any case, the fluid used for either elevation or traction should be a liquid, in order to permit the use of a larger mass of the substance without the weight and bulk of high pressure gas containers.

For low or moderate speeds, the jet velocity from the propelling nozzles 72 (Fig. 9) can be relatively low, and hence a single liquid will be sufficient. This is heated to vapor within the car and then ejected through the members 34 for elevation and through the members 90 and 90a (Fig. 18) for acceleration or deceleration. The use of a single liquid facilitates maintenance of the vacuum.

Figure 22:
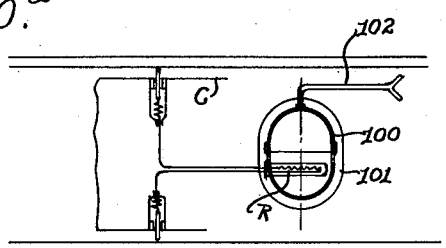
Fig. 22 is a diagrammatic view showing vapor-producing apparatus.

The simplest liquid to produce an active vapor is mercury, contained in a boiler 100 (Fig. 22). This boiler is carefully insulated as at 101 to reduce heat loss and to avoid too great heating of the interior of the car. The vapor is led by pipes 102 to the elevating, accelerating and decelerating members. The preferred means of heating the boiler is by an electrical resistance R enclosed within the heat insulating covering of the boiler. Current is led to the boiler heater from two carbon electrodes 103 (Figs. 1a and 22) coacting with two rails 104 held in an insulating support 105 on the tube T. The rails 104 carry the current for the heating coil R. The advantage of electric heating over heating by combustion is that there will be no products of combustion to escape into the transportation tube or to be caught and retained within the car.

If the air is initially removed from the transportation tube T, a fairly high vacuum can be maintained without pumping, due to the relatively low vapor tension of the mercury. The mercury will be deposited uniformly over the inner wall of the tube T and will run down to the bottom where it can be removed by using receptacles 110 (Fig. 2) located at intervals along the bottom of the tube T, these receptacles being cooled by outside refrigerating coils 111 operated by any convenient refrigerating means 112 driven by a motor 113, the cooling facilitating condensation.

Steam may be used conveniently as the active fluid in place of mercury vapor for moderate car speeds over comparatively long distances, the boiler 100 (Fig. 22) then containing water. Special means to maintain the vacuum will then be necessary, owing to the appreciable vapor pressure of water at ordinary temperatures.

The water vapor in the transportation tube may be removed by receptacles and cooling coils, as explained for mercury, or by absorption produced by a suitable substance in containers 42 (Fig. 3) or 110 (Fig. 2). One such substance is calcium chloride, from which the water may be later removed by heating, after closing off the receptacle as 110 by a large valve 115 and then unfastening and removing the receptacle from the tube. A small valve 116 allows air to enter the receptacle when the valve 115 is closed, thus equalizing the air pressure inside and outside of this receptacle before removal. This valve also permits exhausting the receptacle, after replacement and before the valve 115 is opened.

For fairly high velocities, the film resistance of the elevating recesses 35 (Fig. 6) or of the porous plugs 52 (Fig. 7) will be so high that the liquid may be piped directly from the boiler 100 (Fig. 22), the liquid becoming vapor in the narrow space between the elevating member and the rail.

Figure 23:
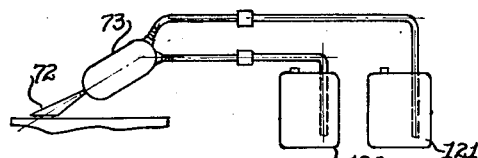
Fig. 23 is a diagrammatic view showing apparatus for producing combustion gases.

For very high car speeds, a high velocity of the gases from the nozzles 72 is required for efficient operation. This necessitates the use of high energy fuels in a combustion chamber 75 as shown in Fig. 23. Tanks 120 and 121 supply liquid oxygen and gasoline or equivalent liquids to the combustion chamber, and the combustion gases are discharged at high speed from the nozzle 72.

These matters will not be further described, forming no part of the present invention.

The products of complete combustion of the oxygen and gasoline are water and carbon dioxide, both of which have relatively high vapor pressures, especially the latter. Hence absorbers as 110 (Fig. 2) or 42 (Fig. 3) are required at intervals along the tube T. Calcium chloride may be used as the absorbing substance for the water vapor and a metal, metallic oxide or metallic hydroxide may be used for the carbon dioxide.

The liquid for the elevating members may now be either water or liquid carbon dioxide, supplied respectively from a boiler or from a pressure cylinder, since absorbers for both vapors are necessarily present in the transportation tube.

As soon as deceleration starts, at the midpoint of the journey or at the termination of a constant high speed period, the gas or vapor in the tube T begins to be compressed in front of the vanes 92, and this compression continues as more vapor is gathered up until the end of the journey. The density of the vapor or gas therefore tends to rise toward the ends of the tube T and hence the absorbers 42 are spaced closer together toward the ends, as indicated in Fig. 3.

Having described the details of construction of my improved transportation system, the operation thereof is believed to be clearly apparent. When the car is in motion and pressure is supplied to the supporting and stabilizing devices, the car will practically travel on a pressurized fluid film disposed between the supporting devices and the guiding rails. At the same time, rapid acceleration or deceleration may be attained by the supply of gases under pressure through the nozzles to the accelerating devices 70 or 90 or to the corresponding decelerating devices.

I have also described effective means for maintaining a substantial vacuum in the transportation tube by condensation or absorption of the gases or vapors which are released in the tube by the operation of the elevating or accelerating devices.

Having thus described my invention and the advantages thereof, I do not wish to be limited to the details herein disclosed, otherwise than as set forth in the claims, but what I claim is:

1. In a vacuum tube transportation system having a tube maintained under a substantial vacuum, a car mounted to slide in said tube and means to accelerate said car, separate supporting devices on said car and coacting rails in said tube, that improvement which comprises means to force a pressurized fluid through said separate supporting devices and against said rails to elevate and clear said car from said rails.

2. The combination in a vacuum tube transportation system as set forth in claim 1, in which the supporting devices have recesses exposed to said rails and also have restricted but open connections through which a limited flow only of fluid under pressure may be delivered to said recesses.

3. The combination in a vacuum tube transportation system as set forth in claim 1, in which the supporting devices have recesses exposed to said rails and also have open zig-zag passages through which fluid under pressure may be delivered to said recesses, and the flow of said fluid being restricted by said passages.

4. The combination in a vacuum tube transportion system as set forth in claim 1, in which said devices have porous metal plugs engaging said rails and in which means is provided to force fluid under pressure through said plugs and against said rails.

5. The combination in a vacuum tube transportation system as set forth in claim 1, in which the coacting surfaces of the supporting devices and rails are respectively convex and concave segmental surfaces.

6. In a vacuum tube transportation system having a tube maintained under a substantial vacuum, a car mounted to slide in said tube, fluid-pressure means to substantially prevent friction between said car and tube, a rail in said tube and an accelerating device on said car, that improvement which comprises providing said rail and device with coacting helical gas passages, and providing means to supply gas under pressure to said coacting passages.

7. The combination in a vacuum tube transportation system as set forth in claim 6, in which a combustion chamber in said accelerating device is effective to supply combustion gases under high pressure direct to said coacting passages.

8. In a vacuum tube transportation system having a tube maintained under a substantial vacuum, a car mounted to slide in said tube, a rail in said tube, an accelerating device on said car that improvement which comprises providing said rail with a series of inclined buckets extending throughout its length and in providing said accelerating device with an inclined nozzle and in providing a limited number of inclined buckets therein, and means to supply gas under pressure to said nozzle, acceleration being produced by the compression and rebound of the gases released by said nozzle and redirected by said coacting buckets.

9. In a vacuum tube transportation system having a tube maintained under a substantial vacuum and a car mounted to slide in said tube, that improvement which comprises car-supporting means operating by the slow escape and vaporization of a pressurized fluid between fixed and movable parts, and decelerating means coacting with said released vapors and comprising a plurality of overlapping vanes mounted for radial outward movement to fixed position on said car and in the annular space between the car and the tube, said vanes engaging and compressing said vapors to cushion and decelerate said car

ROBERT H. GODDARD.

REFERENCES CITED

The following references are of record in the file of this patent:

UNITED STATES PATENTS

| Number | Name | Date |
|---|---|---|
| 165,092 | Gregg | June 29, 1875 |
| 319,335 | Smith | June 2, 1885 |
| 425,408 | Craw | Apr. 15, 1890 |
| 930,244 | Theryc | Aug. 3, 1909 |
| 936,395 | Worthington | Oct. 12, 1909 |
| 969,772 | Cobb | Sept. 13, 1910 |
| 1,000,009 | Jenison | Aug. 8, 1911 |
| 1,053,368 | Eells | Feb. 18, 1913 |
| 1,199,359 | Fottinger | Sept. 26, 1916 |
| 1,336,732 | Davy | Apr. 13, 1920 |
| 1,411,597 | Trask | Apr. 4, 1922 |
| 2,041,607 | Hopkins | May 19, 1936 |
| 2,296,771 | Crawford et al. | Sept. 22, 1942 |

FOREIGN PATENTS

| Number | Country | Date |
|---|---|---|
| 12,108 | Great Britain | of 1848 |
| 20,581 | Great Britain | of 1889 |